United States Patent [19]

Wilder

[11] Patent Number: 4,981,189

[45] Date of Patent: Jan. 1, 1991

[54] POWER ASSISTED VEHICLE STEERING SYSTEM AND GEAR AND POWER ASSISTANCE MEANS FOR SUCH A GEAR

[75] Inventor: Anthony J. Wilder, Westbury-on-Trym, Great Britain

[73] Assignee: TRW Cam Gears Limited, England

[21] Appl. No.: 366,775

[22] Filed: Jun. 15, 1989

[30] Foreign Application Priority Data

Jun. 16, 1988 [GB] United Kingdom ............... 8814358

[51] Int. Cl.$^5$ ............................................ B62D 5/06
[52] U.S. Cl. ................................... 180/148; 180/154
[58] Field of Search ..................... 180/148, 154, 158

[56] References Cited

U.S. PATENT DOCUMENTS

| | | | |
|---|---|---|---|
| 4,144,948 | 3/1979 | Sergay | 180/148 |
| 4,580,651 | 4/1986 | Adams | 180/148 X |
| 4,834,202 | 5/1989 | Shimizu | 180/148 X |

*Primary Examiner*—Charles A. Marmor
*Assistant Examiner*—Mitchell Bompey
*Attorney, Agent, or Firm*—Tarolli, Sundheim & Covell

[57] ABSTRACT

A power assisted vehicle steering system, gear or a power assistance means for a vehicle steering gear comprises a housing 1 for a rack bar 4 which is displaceable in response to a steering input. The rack bar housing is resiliently mounted in a bracket 10 bolted to a frame 9 of the vehicle and is longitudinally displaceable relative to the bracket 10 as a reaction from displacement of the rack bar 4. Longitudinal displacement of the housing 3 adjusts a spool valve 20 on the bracket 10. Adjustment of the valve 20 controls a ram 13 which reacts between the bracket 10 and the rack bar 4 to provide power assistance to the intended displacement of the rack bar 4.

The valve 20 can be incorporated as part of the ram 13. The ram 13 can be replaced by an alternative servo motor such as an electric motor and an alternative form of control such as an electrical switch to load cell can be provided for the valve 20.

Components of the gear are conveniently provided as a kit for conversion of a wholly manual gear to a power assisted gear.

14 Claims, 3 Drawing Sheets

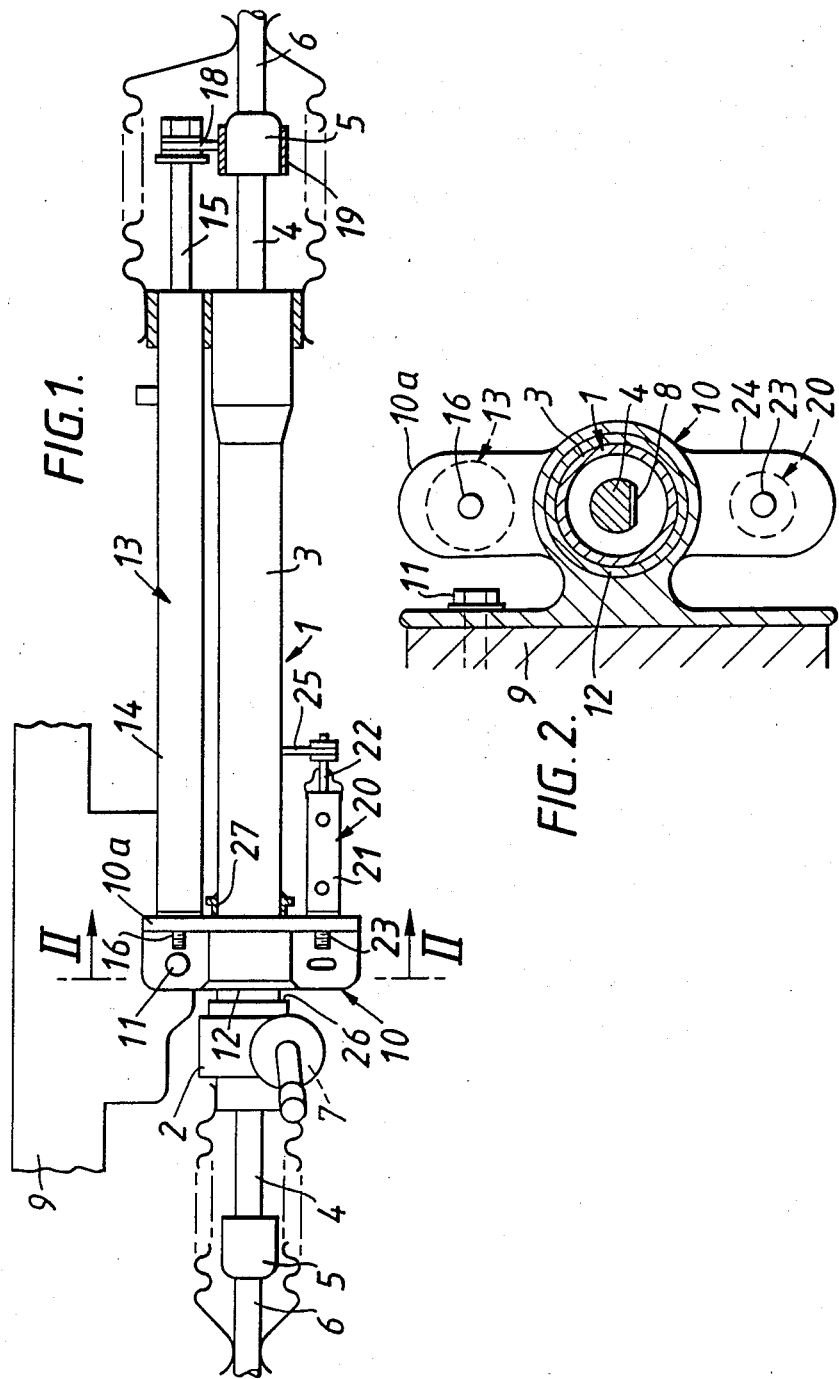

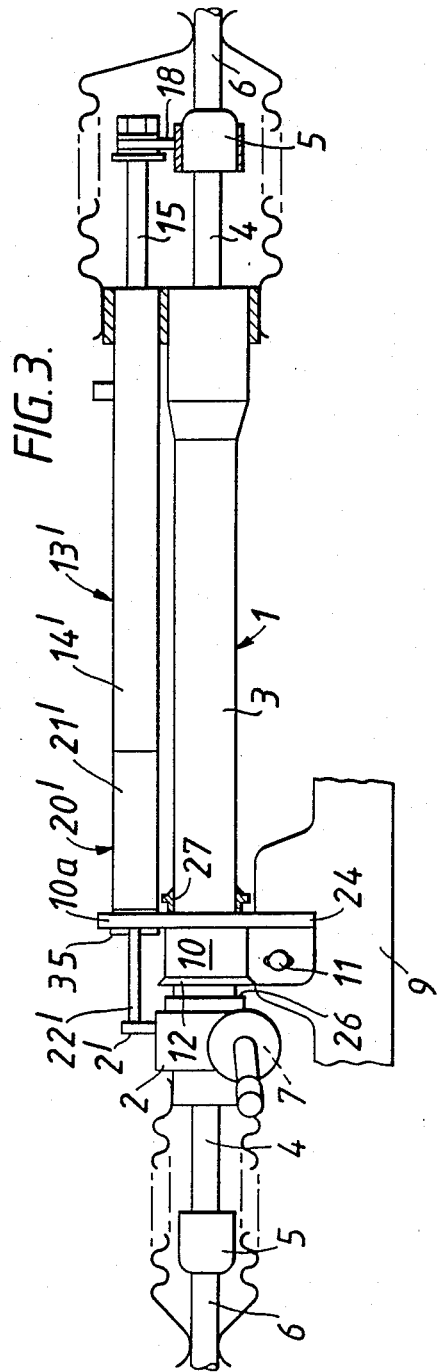

POWER ASSISTED VEHICLE STEERING SYSTEM AND GEAR AND POWER ASSISTANCE MEANS FOR SUCH A GEAR

TECHNICAL FIELD AND BACKGROUND ART

The present invention relates to a power assisted vehicle steering system and gear and to a power assistance means for a vehicle steering gear.

Power assisted vehicle steering gears include a servo motor which is controlled in response to a steering input assist displacement of a steering output component which effects the steering maneuver. Usually the servo motor is in the form of an hydraulic ram or electric motor. Control means for the servo motor and which is responsive to the torque applied during the steering input is usually in the form of an hydraulic valve (having parts which are relatively displaceable against resilient biasing and in response to the input torque), electric micro-switches or load cells all of which are well known in the art. It is conventional for the servo motor and its control means to be incorporated in a power assisted vehicle steering gear as an integral structural part of that gear. As a consequence of necessary additional components, and complexity of manufacture and assembly, power assisted steering gears are inevitably more expensive than wholly manual steering gears. Furthermore, it is generally recognized that a decision has to be made during the original design and costing of a particular vehicle whether the steering gear on that vehicle is to be manual or power assisted; if this decision is for a manual gear then it is usually considered as impractical and uneconomic to replace the manual gear by a power assisted gear during the life of the vehicle. However, it is apparent that there is a requirement for a relatively inexpensive power assisted steering gear which may easily be fitted as original equipment to a vehicle and may be particularly suitable to achieve as a conversion of an existing wholly manual steering gear. It is an object of the present invention to satisfy the aforementioned requirement (even bearing in mind that one appropriate means for converting a manual steering gear into a power assisted steering gear has already been proposed in our British Pat. Specification No. 2,197,827A).

STATEMENTS OF INVENTION AND ADVANTAGES

According to the present invention there is provided a power assisted vehicle steering system comprising an output component displaceable relative to a housing for that component and in response to a steering input for effecting a steering maneuver, said housing being mounted for displacement relative to a frame part of the vehicle; a servo motor for assisting displacement of the output component and reacting between the output component and the vehicle frame part, and control means for controlling actuation of the servo motor, and wherein said control means is responsive to relative displacement between the housing and the frame part as a reaction to a steering maneuver and that response controls the servo motor to assist the maneuver.

Further according to the present invention there is provided a power assisted vehicle steering gear comprising an output component displaceable relative to a housing for that component and in response to a steering input; mounting means for attaching the gear to a frame part of a vehicle in which the gear is to be installed, said housing being mounted by the mounting means for displacement relative thereto; a servo motor for assisting displacement of the output component and reacting between the output component and the mounting means, and control means for controlling actuation of the servo motor, said control means being responsive to relative displacement between the housing and the mounting means as a reaction to a steering maneuver and that response by the control means effecting in control of the servo motor to assist the maneuver.

The power assistance facility which is provided by the present invention may be incorporated in the steering system of a vehicle during the original manufacture of that vehicle. However, the invention was primarily developed to provide a convenient and inexpensive means for converting an existing manual vehicle steering gear to a power assisted steering gear. With this in mind there is still further provided according to the present invention a power assistance means for a vehicle steering gear having an output component longitudinally displaceable in a housing in response to a steering input and wherein the power assistance means comprises mounting means for remounting the housing on a frame part of the vehicle to which the gear is fitted, said mounting means permitting longitudinal displacement of the housing, relative thereto as a reaction to a steering maneuver effected by longitudinal displacement of the output component, a servo motor for assisting longitudinal displacement of the output component, said servo motor being coupled to the mounting means and connectable to react between the output component and the mounting means, and control means for controlling actuation of the servo motor, said control means being coupled to the mounting means and connectable to be responsive to longitudinal displacement between the housing and the mounting means as a reaction to a steering maneuver and that response by the control means serving to control the servo motor to assist the maneuver.

From the aforegoing statements of the present invention it will be realized that the control for operation of the servo motor to assist a steering maneuver is achieved as a result of the housing for the output component being displaced relative to a frame part of the vehicle (or relative to a mounting by which the gear is attached to the vehicle frame) so that the sensing for the control means is achieved externally of the basic gear structure. Furthermore the control means and the servo motor can also be external of what may be considered to be the basic gear structure so that appropriate fittings can conveniently be applied to modify an existing manual steering gear.

Preferably the housing is carried to be resiliently displaceable in response to the reaction from the output component during a steering maneuver. Accordingly the housing may be resiliently mounted, for example by elastomeric material or springs, on the vehicle frame part or in a bracket by which the gear is attached (or intended to be attached) to the vehicle frame.

The present invention was primarily (but not exclusively) developed for vehicle steering gears of the rack and pinion kind where a rack bar provides the output component and is longitudinally displaceable in the housing by rotation of a pinion in response to a steering input, the pinion being mounted in the housing so that its teeth engage those of the rack bar. With such a conventional form of rack and pinion gear the rack bar housing may be carried by a resilient or spring loaded seating in a mounting bracket by which the gear is attached to the vehicle frame. The resilient or spring loaded mounting for the rack bar housing will permit the rack bar to be displaced longitudinally as a reaction to longitudinal displacement of the rack bar during a steering maneuver. This longitudinal displacement of the housing relative to the mounting bracket would likely be restricted by abutting stops on the housing and bracket. The displacement exhibited by the housing will naturally have to be adequate to actuate the control means for operating the servo motor but even so this displacement may be extremely small, say in the order of 2 millimeters overall where the control means is an hydraulic valve or microswitch and possibly less than 2 millimeters where the control means is a load cell. With rack and pinion gears the servo motor will usually be in the form of a double acting hydraulic ram and conveniently this is coupled at one end to the mounting bracket while its opposite end is adapted to be coupled to the rack bar (for example through the casing of a ball joint by which an end of the rack bar is connected to a tie rod).

With an hydraulic ram for the servo motor, the control means will conveniently comprise a spool valve with one of its spool and spool housing coupled to the mounting bracket and the other coupled (or arranged to be coupled) to the rack bar housing so that relative displacement between the housing and the mounting bracket operates the valve.

The control means and servo motor may be separate or may have a unified structure as a compact unit. For example a ram housing of the servo motor may be extended with a co-axial spool housing of a spool valve for controlling the servo motor so that the extended, unified, housing is connected to the mounting bracket/vehicle frame while the spool of the valve is coupled to be displaceable with the rack bar housing and the piston of the ram is coupled to the rack bar.

From the aforegoing it will be appreciated that a manual rack and pinion steering gear of conventional structure can be converted to a power assisted form relatively easily be removing conventional attachments between the rack bar housing and the vehicle frame and re-attaching the rack bar housing to the vehicle frame through the mounting bracket and connecting the control valve and power assistance ram to the rack bar housing and rack bar respectively. For convenience we have not referred above to the arrangements for supply of hydraulic fluid and/or electrical system that may be required for operation of the control means and/or the servo motor since it will be appreciated that the arrangement and operation of the hydraulic and electrical facilities will readily be apparent to persons skilled in the art.

DRAWINGS

Embodiments of a vehicle steering system having a steering gear and power assistance means constructed in accordance with the present invention will now be described, by way of example only, with reference to the accompanying illustrative drawings in which:

FIG. 1 is a side elevation diagrammatically illustrating a first embodiment of the invention incorporating a rack and pinion steering gear;

FIG. 2 is a section on the line II—II of the assembly in FIG. 1;

FIG. 3 is a similar view to that shown in FIG. 1 and diagrammatically illustrates a modification in the positioning of the servo motor control in the gear;

DETAILED DESCRIPTION OF DRAWINGS

Figure 4:
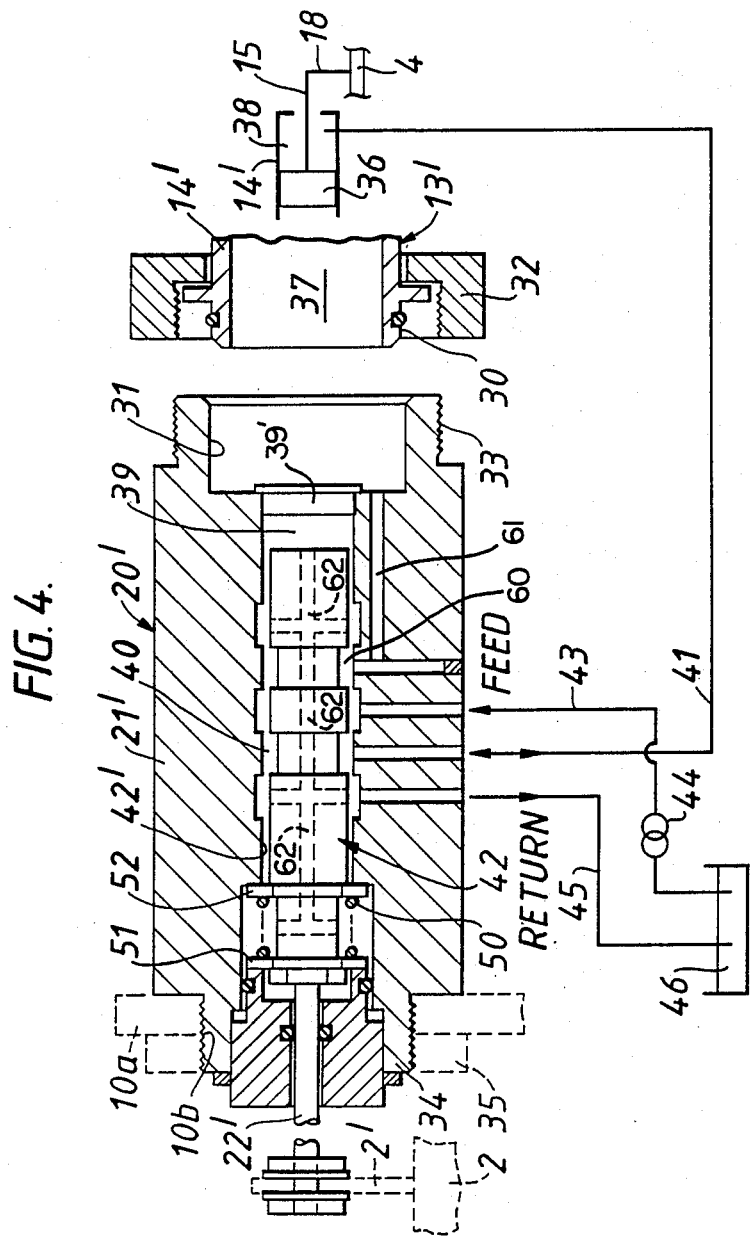
FIG. 4 shows a longitudinal section through a spool valve which controls the servo motor in the arrangement shown in FIG. 3 and schematically shows an hydraulic system for the servo motor.

The steering gear illustrated is based on a conventional rack and pinion structure (as would be expected for a wholly manual steering system) and has a tubular housing 1 constituted by a pinion housing part 2 and a longitudinally extending rack bar housing part 3. A rack bar 4 extends longitudinally through the housing 1 and has its ends connected through ball joints 5 to tie rods 6. The tie rods 6 are coupled into the steering gear linkage of a vehicle in known manner. Rotatably mounted in the housing part 2 is a pinion 7, the teeth of which engage with a rack 8 on the rack bar so that rotation of the pinion in response to a steering input torque displaces the rack bar 4 longitudinally relative to the housing 1 to effect a steering maneuver.

In a conventional, wholly manual, steering gear the housing 1 would normally be rigidly attached by clamps or bolts to a chassis or frame 9 of the vehicle. In the embodiment of the present invention however the tubular housing 1 is received within, and longitudinally displaceable relative to, a bracket 10 and the latter is rigidly attached, for example by bolts 11 to the vehicle frame 9. The housing 1 is resiliently mounted in the bracket 10 by an elastomeric annular seating 12 sandwiched between the housing and bracket.

The gear shown in FIG. 1 has a servo motor in the form of a double acting hydraulic ram 13 comprising a ram housing 14 within which a piston having a piston rod 15 is displaceable in response to fluid pressure differentials applied to opposite sides of the piston. The ram housing 14 is bolted at its end 16 remote from the piston rod 15 to a flange 10a of the mounting bracket 10 while the end of the piston rod 15 which extends from the ram housing is coupled at 18 to a casing 19 of the ball joint 5 so that the piston rod and rack bar will exhibit substantially parallel and unified longitudinal displacement.

The ram 13 is controlled by a spool valve 20 comprising a spool housing 21 within which is axially displaceable a spool having an axially extending spool rod 22. The spool housing 21 is bolted at its end 23 to a flange 24 of the bracket 10 while the spool rod 22 is coupled at 25 for parallel and unified longitudinal displacement with the housing 1.

The spool valve 20 and ram 13 are hydraulically interconnected and incorporated in an hydraulic control system which provides the ram with open center/open return characteristics as are well known in the art of power assisted steering systems. For convenience therefore the full hydraulic system and the interconnection of the ram and spool valve within that system have been omitted from FIGS. 1 and 2 (although these will be discussed generally hereinafter with reference to FIG. 4).

When the rack bar 4 in FIG. 1 is displaced in response to a steering input torque through the pinion 7 to turn steerable road wheels of the vehicle, the resistance to turning movement of the road wheels results in a reaction to displace the housing 1 in a longitudinal direction opposite to that in which the rack bar is displaced. Displacement of the housing 1 is permitted by the resilient seating 12 so that the housing 1 moves longitudinally relative to the fixed mounting bracket 10. Since the spool of the valve 20 is connected through the spool rod 22 and coupling 25 for unified longitudinal displacement with the housing 1 while the spool housing 21 is fixed relative to the bracket 10, the displacement of the housing 1 results in adjustment of the spool valve 20 from its neutral condition. The latter adjustment controls the flow of hydraulic fluid to opposed chambers in the ram 13 to actuate the ram and extend or contract the piston rod 15 to provide power assistance for the displacement of the rack bar 4.

It will be appreciated that if the resistance to turning of the steerable road wheels increases it will be necessary to apply a greater input torque to rotate the pinion 7. This will result in a greater reaction being applied to the housing 1 to cause the housing and the spool of the spool valve to be displaced to a greater extent from the neutral condition—as a consequence a greater fluid pressure differential will be developed in the ram to assist the steering maneuver.

The spool valve 20 will usually be sensitive to extremely small longitudinal displacements of the housing 1—in practice it is expected that full control of the hydraulic system will be provided by axial displacement of the spool in its housing 21 of approximately + or −1 millimeter from a control neutral condition of the spool. Stops indicated at 26 and 27 are provided on the housing 1 for abutment with the bracket 10 to restrict the longitudinal displacement which is permitted for the housing 1 relative to the bracket 10.

In the modification shown in FIGS. 3 and 4 the spool valve 20 and ram 13 of FIG. 1 have effectively been combined as indicated at 20' and 13' respectively to form a single compact unit which extends longitudinally from the flange 10a of the bracket 10.

The structure of the unit 13'/20' is better seen from FIG. 4 where the tubular spool housing shown at 21' is coupled in end-to-end and co-axial relationship with the tubular ram housing shown at 14'. The coupling between the housings 14' and 21' is conveniently effected by a spigot end 30 of the ram housing being received in a socketed end 31 of the spool housing and retained by engagement of an internally screw threaded collar 32 on the ram housing with a complementary external thread 33 on the spool housing. The spool housing 21 has its end 34 remote from the ram externally screw threaded and received in a complementary hole 10b through the bracket flange 10a and is retained rigidly attached to the flange by a nut 35.

In FIG. 4 the general arrangement of the hydraulic system and of the ram 13 are indicated diagrammatically only where it will be seen that the ram piston 36 forms in the housing 14' opposed chambers 37 and 38 of which the chamber 37 is closed to communication with a spool end chamber 39 by a plug 39' and is in constant communication with an annular spool transfer chamber 60 by way of a conduit 61. The chamber 38 is in constant communication with an annular spool transfer chamber 40 by way of a conduit 41. The spool of the valve 20' (shown diagrammatically at 42) is axially displaceable in a spool cylinder 42' and has a spool rod 22' which extends from the spool housing through the bracket 10a to be coupled to a flange 2' on the pinion housing part 2. The spool valve 20' has a pressure/feed conduit 43 from a pump 44 and a return/exhaust conduit 45 to a reservoir 46. The spool 42 is arranged together with its control ports and lands and also with those of the spool cylinder 42' to provide open center-/open return characteristics for the ram chambers 37 and 38. Open center/open return spool valves are well known and conventional for power assisted steering gears whereby when the spool is in a neutral condition both ram chambers 37 and 38 and the output from the pump 44 communicate with the reservoir 46. If the spool 42 is displaced rightwardly in FIG. 4 relative to its cylinder and from the neutral condition, the ram chamber 38 progressively opens communication with the pump output 43 while the latter closes communication with the return 45 and ram chamber 37 progressively opens its communication with the return by way of conduit 61, transfer chamber 60 and internal return conduit 62 within the spool and closes communication with the pressure output—the ram piston 36 is consequently displaced leftwardly in the figure to assist displacement of the rack bar 4. If the spool 42 is displaced leftwardly from its neutral condition in FIG. 4, the ram chamber 38 is progressively closed to communication with the pump output 43' and opens communication with the return line 45 while the ram chamber 37 is progressively closed to communication with the return line 45 and opens to communication with the output from the pump 44—the ram piston 36 is consequently displaced rightwardly in FIG. 4 to assist displacement of the rack bar. Similarly to conventional open center type spool valves, the spool 42 is biased axially to its neutral condition by a spring 50 (which acts between freely floating plates 51, 52 and against shoulders of the spool and of the spool housing in known manner).

From the hydraulic control system as above described with reference to FIG. 4, it will be appreciated that when the pinion 7 is rotated in response to a steering input torque to displace the rack bar 4 in one sense of direction there is a reaction on the housing 3 which displaces the housing longitudinally in the opposite sense of direction. The spool 42 is thereby displaced axially in said opposite sense of direction (through the coupling of the flange 2' and spool rod 22') so adjusting the spool valve 20' from its neutral condition and pressurising the piston ram 36 to be driven in the first sense of direction to provide power assistance to the required displacement of the rack bar 4. When the steering input torque to the pinion ceases the housing 1 will be displaced longitudinally relative to the bracket 10 in the first sense of direction to revert to its original (control) position by the effect of its resilient mounting within the bracket 10 (which may bias the housing longitudinally to its control position) and by the reaction from the piston rod 15 providing power assistance in the first sense of direction as a minimal over-run which will cause the spool valve to revert to its neutral condition.

In the aforegoing embodiments the power assistance is provided hydraulically. However, it will readily be appreciated by persons skilled in the art that the provision of the power assistance can be wholly electric or a combination of hydraulics and electrics. For example in FIG. 1 the spool valve 20 can be replaced by an electrical switch device or load cell which provides the required sensing means, similar to the spool, that is responsive to displacement of the housing 1 to control the flow of hydraulic fluid to the ram 13. Alternatively the ram 13 can be replaced by an electric motor which, for example, when driven extends and contracts a rod similar to the piston rod 15 and reacts between the bracket 10 and coupling 18; the electric motor could be controlled from a sensing switch conveniently located at the positions of the valves 20, 20'.

The examples of the steering gear and system as above described and illustrated all include a conventional form of wholly manual rack and pinion steering assembly. Consequently such a gear if originally fitted to a vehicle may be converted to provide power assistance relatively easily by re-mounting the rack housing 1 of the gear within the bracket 10, providing the appropriate coupling between the control spool valve 20 and the rack housing and also between the ram rod 15 and the rack bar, and modifying the hydraulic system of the vehicle to provide the facility indicated in FIG. 4. For the purpose of effecting a conversion as aforementioned, the required components can conveniently be marketed as a kit.

I claim:

1. A power assisted vehicle steering gear comprising:
   a first housing;
   an output component carried by said first housing and displaceable relative thereto in response to a steering input;
   a mounting bracket for attaching said first housing to a frame part of a vehicle in which the gear is to be installed, said first housing being resiliently mounted by said bracket to be displaceable relative to said bracket as a reaction to a steering input;
   a servo motor ram coupled to said output component to assist displacement of said output component, said servo motor ram having a ram housing carried by said mounting bracket so that said servo motor ram reacts between said output component and said mounting bracket; and
   control valve means to control actuation of said servo motor ram, said control valve means comprising a valve housing carried by said mounting bracket, and a valve member displaceable relative to said valve housing and coupled to said first housing for displacement therewith relative to said mounting bracket, whereby relative displacement between said first housing and said mounting bracket as a reaction to a steering input effects a displacement of said valve member relative to said valve housing and said mounting bracket to adjust said control valve means and to actuate said serve motor ram to assist in displacement of said output component in accordance with said steering input.

2. A gear as defined in claim 1 in which said ram housing and said valve housing are individually fixedly secured directly to said mounting bracket.

3. A gear as defined in claim 1 in which said ram housing and said valve housing have a unified structure which is fixedly secured directly to said mounting bracket.

4. A gear as defined in claim 3 in which said ram housing provides for axial displacement of said servo motor ram, and said valve housing provides for axial displacement of said valve member, and wherein said ram housing and said valve housing are substantially co-axial and extend one from the other as a compact unit.

5. A gear as defined in claim 1 in which said output component comprises a rack bar longitudinally displaceable in a rack bar housing by rotation of a pinion responding to a steering input.

6. A gear as defined in claim 1 wherein said first housing is an elongated member having a first longitudinal axis;
   said ram housing is an elongated member having a second longitudinal axis;
   said valve housing is an elongated member having a third longitudinal axis; and
   said mounting bracket supports said housings in position wherein said axes are parallel and lie in a common plane.

7. A gear as defined in claim 6 wherein said mounting bracket supports said housings with said first longitudinal axis having a position in said plane between said second and third longitudinal axes.

8. A gear as defined in claim 7 wherein said ram housing and said valve housing have axial ends, and said axial ends are rigidly connected to said mounting bracket.

9. A gear as defined in claim 8 wherein said mounting bracket has opposite axial sides, and said ram housing and said valve housing extend from said mounting bracket on the same axial side of said mounting bracket.

10. A gear as defined in claim 6 wherein said valve housing and said ram housing are coaxially joined.

11. A gear as defined in claim 1 wherein said first housing is an elongated member having a longitudinal axis;
    said ram housing is an elongated member having a second longitudinal axis and an axial end;
    said valve housing is an elongated member having a third longitudinal axis and an axial end;
    said mounting bracket comprises a sleeve portion and a supporting portion, said sleeve portion being received over said first housing, said supporting portion having opposite axial sides with respect to said first longitudinal axis; and
    said axial ends of said ram housing and said valve housing are rigidly connected to said supporting portion of said mounting bracket, with said ram housing and said vale housing extending axially from the same axial side of said supporting portion of said mounting bracket.

12. A gear as defined in claim 11 wherein said output member is an elongated rack;
    said first housing has a pinion part for receiving a pinion and an elongated rack part for receiving said rack, said rack part having a first axial end adjacent to said pinion part and a second axial end remote from said pinion part;
    said sleeve portion of said mounting bracket is received over said rack part of said first housing at a position adjacent to said first axial end of said rack part; and
    said ram housing and said valve housing extend from said mounting bracket axially toward said second axial end of said rack part.

13. A gear as defined in claim 12 wherein said ram housing and said valve housing are supported by said supporting portion of said mounting bracket in positions with said second and third longitudinal axes lying in a common plane with said first longitudinal axis.

14. A gear as defined in claim 11 wherein said ram housing and said valve housing are coaxially joined, with the axial end of one of said ram and valve housings being connected to said supporting portion of said mounting bracket through the other of said ram and valve housings.

* * * * *

UNITED STATES PATENT AND TRADEMARK OFFICE
CERTIFICATE OF CORRECTION

PATENT NO. : 4,981,189

DATED : January 1, 1991

INVENTOR(S) : Anthony J. Wilder

It is certified that error appears in the above-identified patent and that said Letters Patent is hereby corrected as shown below:

Column 8, Line 40, Claim 11, change "vale" to --valve--.

Signed and Sealed this

Fourteenth Day of July, 1992

Attest:

DOUGLAS B. COMER

Attesting Officer

Acting Commissioner of Patents and Trademarks